(12) United States Patent
Figley et al.

(10) Patent No.: US 8,704,758 B1  
(45) Date of Patent: Apr. 22, 2014

(54) RESISTIVE LOOP EXCITATION AND READOUT FOR TOUCH POINT DETECTION AND GENERATION OF CORRESPONDING CONTROL SIGNALS

(75) Inventors: Curtis B. Figley, Edmonton (CA); Darin Hunt, Edmonton (CA); Andrei Chichak, Edmonton (CA); Brent Baier, Lloydminister (CA)

(73) Assignee: Iron Will Innovations Canada Inc., Lloydminster, Alberta (CA)

( * ) Notice: Subject to any disclaimer, the term of this patent is extended or adjusted under 35 U.S.C. 154(b) by 1197 days.

(21) Appl. No.: 12/590,784

(22) Filed: Nov. 11, 2009

Related U.S. Application Data

(60) Provisional application No. 61/193,307, filed on Nov. 17, 2008.

(51) Int. Cl.  
*G09G 5/00* (2006.01)  
*G06F 3/01* (2006.01)

(52) U.S. Cl.  
CPC ..................... *G06F 3/014* (2013.01)  
USPC ........................................ 345/156

(58) Field of Classification Search  
None  
See application file for complete search history.

(56) References Cited

U.S. PATENT DOCUMENTS

| | | | |
|---|---|---|---|
| 4,414,537 A * | 11/1983 | Grimes | 341/20 |
| 5,906,004 A | 5/1999 | Lebby et al. | |
| 6,080,690 A | 6/2000 | Lebby et al. | |
| 6,141,643 A * | 10/2000 | Harmon | 704/271 |
| 6,210,771 B1 | 4/2001 | Post et al. | |
| 6,670,894 B2 | 12/2003 | Mehrin et al. | |
| 6,727,197 B1 | 4/2004 | Wilson et al. | |
| 6,729,025 B2 | 5/2004 | Farrell et al. | |
| 6,942,496 B2 | 9/2005 | Sweetland et al. | |
| 7,498,956 B2 | 3/2009 | Baier et al. | |
| 2004/0036678 A1* | 2/2004 | Zngf | 345/168 |
| 2004/0051694 A1* | 3/2004 | Backman et al. | 345/156 |
| 2004/0210166 A1* | 10/2004 | Soh et al. | 600/595 |
| 2004/0263358 A1* | 12/2004 | Madsen et al. | 341/20 |
| 2005/0052291 A1* | 3/2005 | Backman et al. | 341/22 |
| 2005/0052412 A1* | 3/2005 | McRae et al. | 345/158 |
| 2006/0248478 A1* | 11/2006 | Liau | 715/863 |

OTHER PUBLICATIONS

E. Rehmi Post, Maggie Orth, Smart Fabric, or Wahsable Comp;uting http://web.media.mit.edu/~rehmi/fabric/.

* cited by examiner

*Primary Examiner* — David D Davis  
(74) *Attorney, Agent, or Firm* — The Marbury Law Group, PLLC

(57) ABSTRACT

A means and method for enabling contact or touch point location detection to be implemented on a particular garment. This means and method simplifies the design of the garment by reducing the number of conductors required to interconnect the various touch points and signal processing circuitry; it provides a way to dynamically reposition or resize the effective touch point target regions; and it provides for new control capabilities by optionally allowing continuously variable user input control.

34 Claims, 16 Drawing Sheets

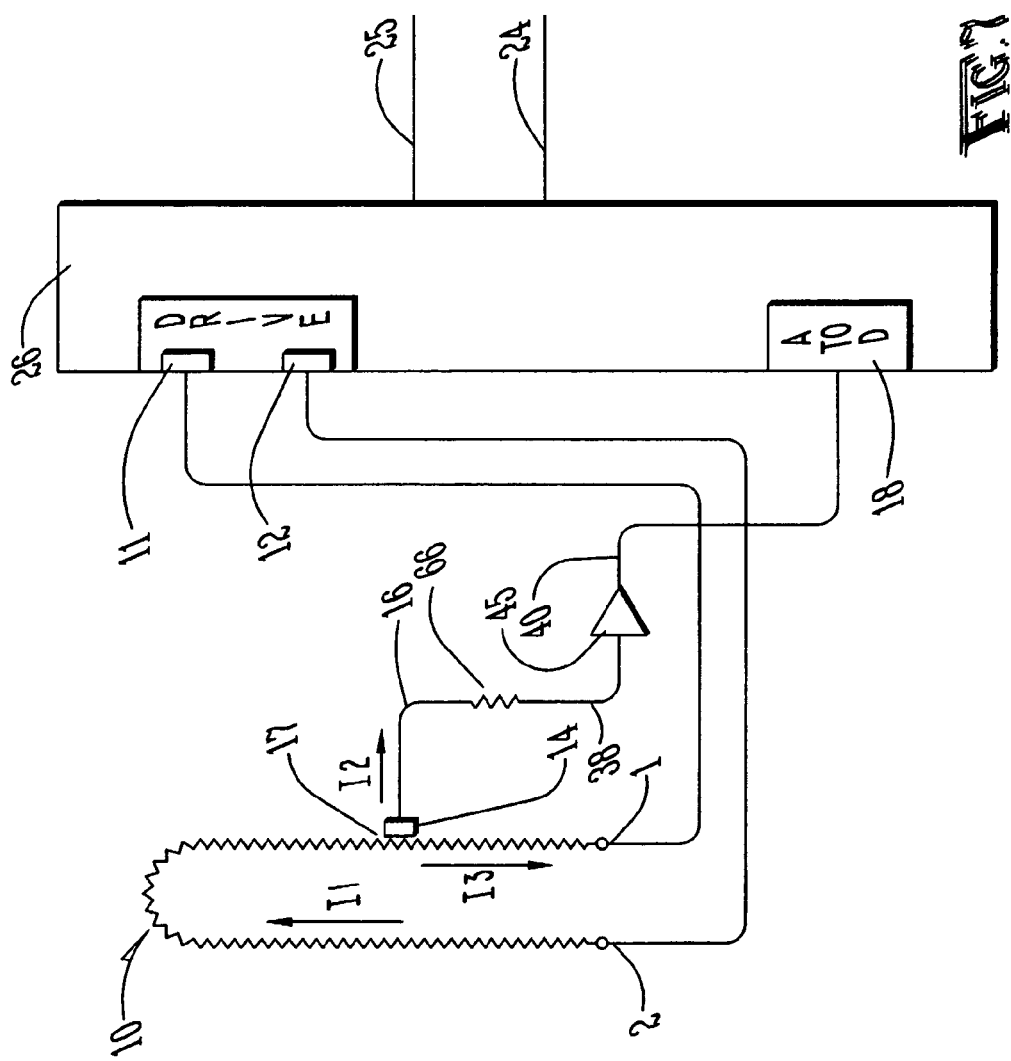

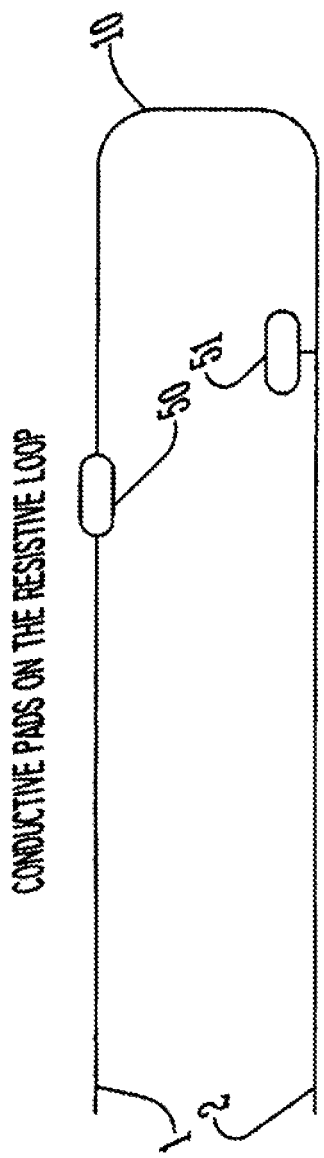
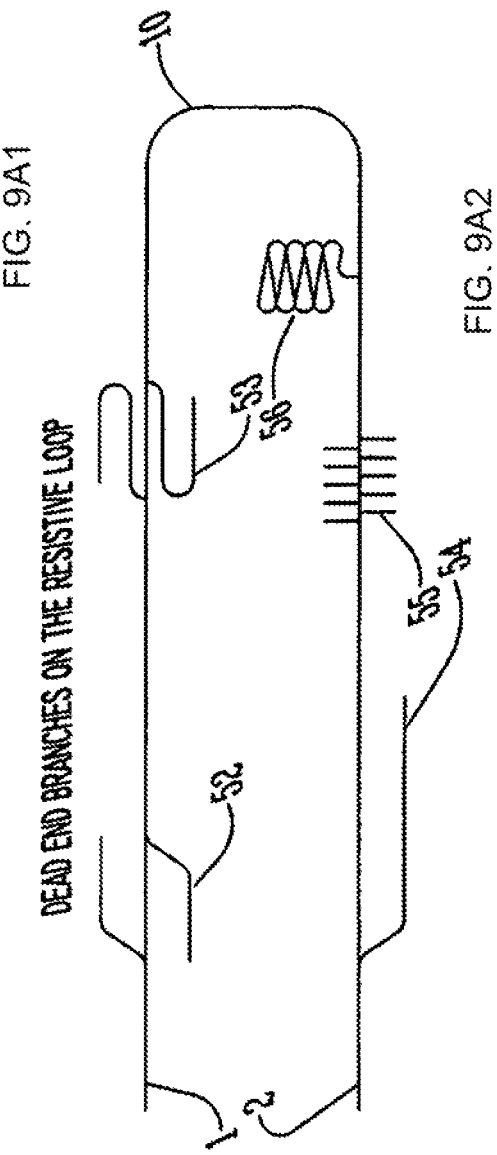
FIG. 9A1 — CONDUCTIVE PADS ON THE RESISTIVE LOOP
FIG. 9A2 — DEAD END BRANCHES ON THE RESISTIVE LOOP

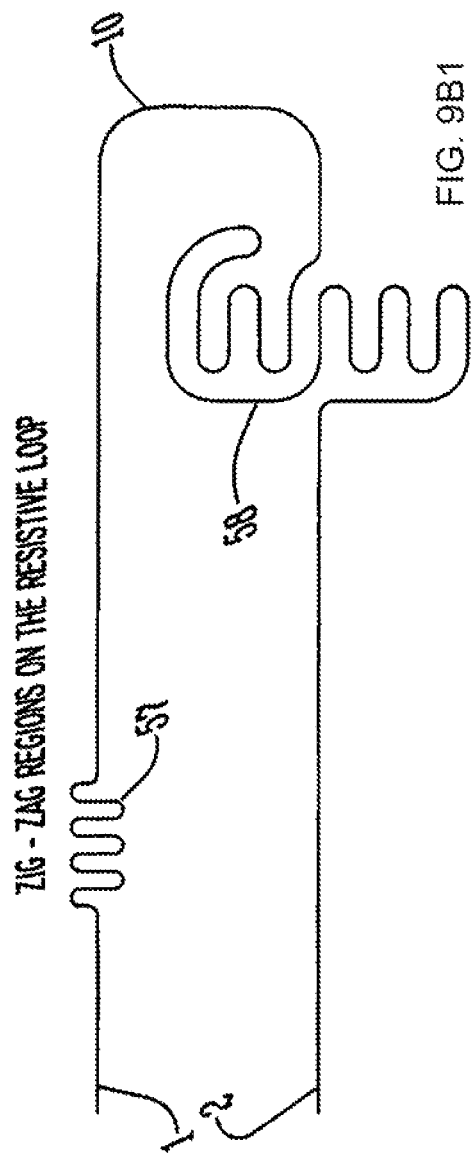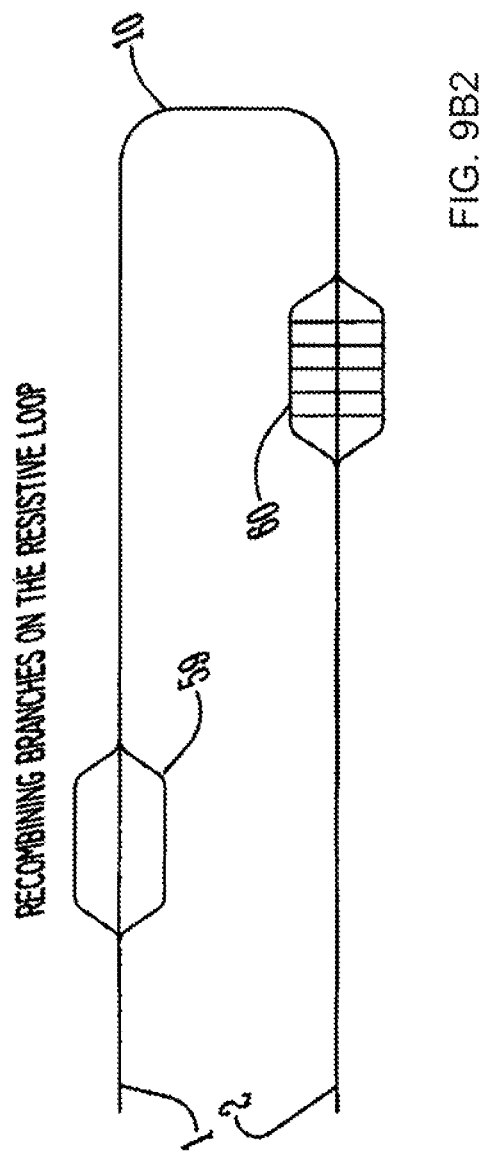

RESISTIVE LOOP EXCITATION AND READOUT FOR TOUCH POINT DETECTION AND GENERATION OF CORRESPONDING CONTROL SIGNALS

CROSS REFERENCE TO RELATED APPLICATIONS

This application claims the priority of the filing date of provisional patent application Ser. No. 61/193,307, filed on Nov. 17, 2009 by the same inventors.

TECHNICAL FIELD OF THE INVENTION

This invention relates to the general area of human/electronic device interface devices and more particularly to the detection and interpretation of finger touches and touch points on gloves or other garments worn on the body to interpret the actions and intent of the wearer.

BACKGROUND TO THE INVENTION

There are many human interface input devices for data, control and command entry into computers and other systems that are in common use. These input devices are typified by keyboards, mice, touch pads, joysticks, graphics tablets and various motion sensitive or motion activated controllers. These input devices are routinely encountered in home, office or industrial settings or in the rapidly expanding areas of console, computer and on-line gaming. There are also many interface devices that have been custom designed for automation and robotic control or to provide alternative control and command capture methods for a wide range of specialized devices.

A new human interface approach that frees the user from many of the drawbacks of traditional input devices uses touch sensors directly embedded or otherwise integrated into fabric garments that are worn by a user. Signals generated by touching these sensors are routed through various circuits sewn, woven or otherwise integrated into or attached to the fabric are conveyed to signal processing circuits mounted at strategic locations in the garment or that may be transmitted to signal processing circuits external to the garment. The signal processing circuits analyze these signals and construct appropriate messages corresponding to the signals that can be sent to a computer or other similar equipment to simulate or mimic traditional user input devices.

One such invention is described previously in U.S. patent application Ser. No. 11/326,029, entitled "Apparatus and Method for Inputting Information", and filed Jan. 4, 2006 in United States, now U.S. Pat. No. 7,498,956, issued 3 Mar. 2009. The disclosure of this patent is fully incorporated herein by reference.

The invention disclosed in the incorporated U.S. Pat. No. 7,498,956 uses a variety of touch points, or contacts, integrated into a glove. Some of these touch points are located at predefined positions along each of the user's fingers. Other contacts on the user's thumb can be manipulated through simple hand gestures to make or break connections with various contacts or combinations of contacts on the fingers, thus allowing the user's hand actions to be decoded electronically and used to input data or to control equipment. This decoding can be done in a variety of ways, for example by using a "row and column" scanning technique. For illumination, one simple form of this device could be to predefine combinations of thumb sensing contacts to finger touch point combinations as unique button presses as on a key board, therefore allowing the glove to interact with a computer in lieu of a regular keyboard.

Extensions to this concept include placing more sensing pads on the palm, on other areas of the glove or on other parts of other garments that are integrated into a larger system.

In the invention disclosed in U.S. Pat. No. 7,498,956, each of the touch points on the fingers are located at discrete locations and are fixed in location and size. Different users of the glove may prefer the touch points to be located in different locations or to have different sizes due to physiological differences, due to ergonomic considerations, due to personal preference, or for other reasons. In addition, different touch point sizes and locations may be desirable for different applications of the glove. Fixed touch points such as in the invention disclosed in U.S. Pat. No. 7,498,956 give an inflexible layout of touch points and may limit that adaptability of the glove to different users.

In the invention disclosed in U.S. Pat. No. 7,498,956, each touch point on the fingers has a separate conductor that carries a signal between the touch point and interface circuitry. For the case of a glove with many touch points, this may result in a complicated glove construction with many conductors and many connections to the interface circuitry.

One possible use of a data input glove would be to provide to a computer a quasi-continuous set of data such as the position of a scroll bar slider, or a magnification for a zoom command where the position of the slider or the value of the magnification would correspond to the position where a thumb contact touches along a finger. Implementation of such functions in a glove such as described in U.S. Pat. No. 7,498,956 would require many finger touch points, conductors, and connections to interface circuitry to provide reasonable resolution and sometimes has a complicated construction.

The instant application fully incorporates herein by reference the provisional application entitled "Glove pattern for continuous conductive traces", Ser. No. 61/193,308, filed by Darin Hunt, et al and filed on Nov. 17, 2009. This provisional application describes a fabric pattern that eliminates seams in the regions of touch points and sensing contacts and allows interconnecting conductive traces to connect from the front of the fingers, thumb or palm to the area of the back of the hand without crossing any seams, thus reducing the need for creating reliable electrical splices in the traces.

OBJECTIVES OF THE INVENTION

Accordingly the present invention has, among others, the following objectives.

Providing a means and a method to detect the presence or absence of a users touch along a curvilinear element, that can be configured as a simple loop or that may form more complex two dimensional regions. This curvilinear element would be established on a flexible material that could be fabricated into a wearable garment such as a glove, armband or vest.

Providing a means and a method to detect the relative location of the users touch on the sensitive region of the curvilinear element to allow different touch locations to be interpreted as different commands. This method can be extended to allowing continuous readout along the length or over the area of a sensitive region so that it may used as a variable input into a control, information or other similar system.

Providing a means and a method to quantize the touch locations detected to create subregions of the sensor, so that the user is not required to accurately target a point on the curvilinear element. Over the length of a subregion, the same control action would be generated so that the device would simulate pushbutton or key press user inputs.

Providing a means and a method to supply a quasi-continuous or digitized representations of the users touch position, such as to simulate the control action of a control slider, knob, mouse, touch pad, joystick or other manually actuated interface used for user input.

Providing touch detection and location information in the form of a digital data stream to a control system that may include a computer, may be a gaming device, or can be another type of electronic signal processing equipment that requires user control input or that is intend to monitor a users activity.

Providing a means and a method to integrate this functionality into a fabric so that a variety of garments can be designed that are comfortable, portable and where the human input portions are non-intrusive.

Providing balanced excitation on circuit elements that may be prone to erosion to prevent exposing the user to potentially dangerous materials that could migrate out of the circuit elements and to reduce circuit degradation that could lead to premature circuit failure.

Providing electrical isolation to separate electrical circuits that may be touched or accessed by the user from those carrying significant power, voltage or current levels.

SUMMARY OF THE INVENTION

The present invention provides a unique means and method for enabling the contact or touch point location detection to be implemented on a particular garment. This means and method simplifies the design of the garment by reducing the number of conductors required to interconnect the various touch points and signal processing circuitry; it provides a way to dynamically reposition or resize the effective touch point target regions; and it provides for new control capabilities by optionally allowing continuously variable user input control.

The objects and results of the present invention are achieved using a touch point readout method wherein some of the touch points are arranged to lie along a resistive loop that traverses a region of the garment.

The resistive loop can be formed by one or more constituents that can be a conductive material such as metalized films, metalized fiber thread, metal fiber bearing thread, fine resistance wire, conductive compound loaded rubber or conductive ink or other similar materials that can be sewn, embroidered, piped, knitted, bonded, adhered or printed on or otherwise integrated into traditional fabrics. Some examples of conductive materials are: Resistex® Inox stainless steel fibre bearing polyester thread available from Tecnofilati Srl of Italy; SXS12 series silver coated fibre thread from Statex Productions & Vertriebs GmbH; conductive elastomer formulations based on nickel graphite powder materials available from Westaim Corporation of Alberta, Canada; conductive ink such as Creative Materials, Inc. of Tyngsboro, Mass. material101-42 electrically conductive ink; or a variety of fine resistance wires available from California Fine Wire Company of Grover Beach, Calif. under their Stablohm product series.

Another resistive loop construction material can be made by winding a long close pitch helix, essentially a thin fine spring, from a comparatively resistive metal alloy such as stainless steel or nickel-chrome wire. The resulting fine spring can be sewn down onto fabric using traditional sewing methods, thus producing a very durable and flexible resistance element easily adapted to a variety of geometries. The added advantage of the spring format is that the relative length of wire conductor is much longer than the length of the spring on the fabric, which helps produce a higher effective resistance per unit length of spring.

All or portions of this conductive material are arranged to be exposed so that an electrical contact can be made at the intended touch points, and as many sensing pads as are suitable can be used on the hand covering or on various parts of other garments and can be integrated into a larger system. Note that within this discussion the phrase "resistive loop" should be considered synonymous with the phrasing "curvilinear conductive element".

For instance using as an illustrative, but not limiting example of a glove as the desired garment, each finger is provided with a separate resistive loop that runs out along the back of the hand, along the edge of the finger to the tip of each finger and then back along the front of each finger to return to the back of the hand. Each of these resistive loops is energized by associated signal processing circuitry so that a differential signal exists across the length of the resistive loop. The loop energization may optionally be performed using a sequential scanning process and may use voltage, current or other excitation techniques known to the art without departing from the scope of the present disclosure.

In this same glove embodiment, the thumb of the glove is equipped with one or more electrically and physically separated sensing contacts or pads that are also connected to the signal processing circuits by conductors integrated into the fabric. If the user places a thumb pad onto one of the loops at some position along the loop's length, an electrical circuit is established over which a signal amplitude representative of the position along the loop is conveyed to the associated signal processing circuitry. The signal processing circuitry measures the amplitude (for example, using an analogue-to-digital converter or A-to-D) in conjunction with the order and timing of the various loop excitation signals, to decode which combination of contacts and touch points were mated. If this process is repeated rapidly, the encoded signals track the existence and location of contacts and are thus a timely representation of the users control inputs. The addition of extra sensing contacts increases the number of sensing contact to touch point combinations that can be distinguished by the system.

In the glove embodiment described previously, the resistive loops and the sensing contacts reside on the same garment. However, other embodiments of the present invention could potentially be of benefit. For instance, a construction exists where the resistive loops are attached to a functionally separate garment than that to which the sensing contacts were attached. An example of such an implementation would be one where the sensing contacts were mounted on the tips of the fingers of a glove worn on one hand and the resistive loops were mounted on a gauntlet worn on the opposing forearm or even another garment altogether, such as a shirt, bib or the like. In the arm-covering implementation, the user would operate the device by touching one or more of the finger tip sensing contacts to the resistive loops on the other arm.

An added benefit of using a sensing contact to return an analogue signal from a point on a resistive loop is that the circuit can be electrically arranged to be relatively insensitive to the contact resistance at the sensing contact. This can be achieved by ensuring that the analogue signal processing circuitry input impedance is high compared to both the excited loop resistance and the normal range of contact point resistances. High input impedance at the analog signal processing circuitry ensures that comparatively little current flows into or out of the analogue signal processing input so that the excitation loop remains undisturbed. Alternately, the current distribution in the various excitation and sensing circuits could be measured, monitored or held at known levels and then appropriate corrections could be made in subsequent processing steps. Methods for configuring sensing loop resistances and manipulating or correcting for the input characteristics of the analogue signal processing inputs can be designed according to the teaching of this disclosure by those skilled in the art.

Note that using the teaching of this disclosure it is possible to form a resistive loop that serpentines over a relatively long and circuitous route, for example, along more than one finger on a glove or so that it may pass back and forth to cover a region on a garment. A highly serpentine path would allow more touch points to be detected along a particular loop and would thus require fewer excitations sources. The path of the resistive loop could be arranged to pass back and forth on a region of the garment to substantially cover a two dimensional region. Using the known path of the resistive loop on the garment, it is possible to translate the sensed location of the touch point along the length of the garment to the two dimensional coordinates of the touch point on the garment. The particular configuration of resistive loops, touch points, sensing contacts and the sequencing of the excitation sources can be understood from the teaching of this disclosure and can be effected for a particular garment's functional and operational needs. However, the general nature of the method allows many combinations to be achieved and it is intended that such embodiments are within the scope of the present disclosure.

This resistive loop readout method and means can also be understood utilizing the teaching associated with a conventional potentiometer, wherein the fixed resistor element of the potentiometer is analogous to the resistive loop of this invention and the wiper contact of the potentiometer is formed by the sensing contact as in the above example of a glove as one of the contacts on the thumb. It is noted that the foregoing example is presented to assist in the understanding of the instant invention and no limitation is intended.

This method and means embodying the present invention significantly reduces the number of conductors and signal connections that are required to readout larger numbers of touch points, as compared to traditional row and column techniques or individually wired switches. This results in simpler constructions for the garments, reduces requirements for high density connectors and optionally allows the positions of touch points to be reconfigured rapidly since the touch point is identified through an analysis of the returned analogue signal.

Without departing from the scope of the present disclosure, it is noted that physically isolated touch points can be implemented to improve tactile identification, by occluding portions of the resistive loop with insulation or providing a physical separation layer. This implementation could be used to provide functionality more like push buttons, since potential analogue values returned by a sensing contact would be restricted to sub-sections of the overall signal range.

Alternately, it is also envisioned that virtual touch points can be electronically or digitally defined by restricting the range of analogue values that would be interpreted as valid contacts. Applying suitable thresholds or other processing restrictions to the sensed signals allows portions of the resistive loop to be programmatically activated or deactivated. In further embodiments, the size and position of virtual touch points can be changed comparatively easily to allow customization of touch point patterns or to allow users to adjust the apparent positions of touch points to accommodate different garment fits or to otherwise alter the arrangement at the level of the user. The resistive loop is a continuous uninterrupted element. If entirely exposed, it defines an uninterrupted continuum of accessible touch points, and if portions of the resistive loop are occluded, it defines multiple, separated, continua of accessible touch points. The number of touch points is theoretically infinite. Another implementation of this invention would allow the variable analogue signal amplitude that can be detected at the sensing contacts to remain as a variable control signal, represented either in the analogue or digital domain. The resulting control signal could include various features known to the art, such as transfer function modification, noise reduction or other similar possibly advantageous characteristics. However, the salient difference here would be the variable nature of the control signal as opposed to that of a binned or button push type of action. This implementation would be advantageous in situations where the underlying control needs were more analogue in nature, such as is the case with a computer mouse, track ball, touch pad or similar input device.

Yet a further implementation of this invention provides for a resistive loop that is configured to lie along a substantially parallel path to a sensing conductor. In this implementation a conductive pad on a digit or other body part could be used to bridge a point on the resistive loop to the adjacent point on the sensing conductor and thus would provide the sensing conductor with a signal representative of the point at which the resistive loop was contacted. If in this implementation, the resistive loop is configured to serpentine over a surface area on the fabric, and the sensing conductor is appropriately arranged to parallel the running portions of the resistive loop, the ensemble could be used as a method to detect the two dimensional coordinates of the touch location. Such a configuration, possibly integrated into a garment such as a cuff or on a sleeve, could be advantageously used as a control mechanism. The bridge or bridges can be adapted to move if suitable. Additional sensing contacts, located elsewhere on the garment or separate from the garment on which the resistive loop is located, can be used in addition to the sensing contact that is located substantially parallel to the resistive loop on the garment.

The invention disclosed herein further contemplates numerous ways that loops can be configured to preferentially fit different applications. These configurations can be driven by various needs, such as ergonomics, as might be the case when positioning the resistive loop touch points and sensing contacts for comfortable and intuitive operation such as on a device configured as a glove. The optimal arrangement of the loops and touch points for an intended application can be effected using the teaching of this disclosure.

Identification of and feedback from of the touch region or touch points can be provided via audio, visual, or tactile feedback or the like. Feedback can be done using a number of techniques known to the art including generating a sound, toggling an indicator or producing a vibration when a touch is effected or the like. Visual and tactile identification of the touch points can be provided though labels, patterns, textures or in some case by the feel of the resistive loop pattern integrated into the fabric.

It is noted that there is yet another non-obvious aspect of this invention, salient to applications and implementations where excitation of the resistive loop might result in electrolytic erosion, corrosion or other material degradation of the resistive loop materials through the direct or indirect action of the differential potentials impressed across the loop. This might be the case where these loop materials are exposed to conductive or electrolyte containing solutions, such as those found in human sweat, blood, food products or sea water. This is particularly important for a glove because during regular wear it commonly touches other objects or materials. Using the teaching of the present disclosure, careful configuration of the excitation drive circuits and scanning sequences can achieve charge or voltage balanced operation of the resistive loop, by arranging for the loop excitation amplitude to reverse polarity at appropriate times to zero the net current. The invention contemplates various options for this and includes, but is not limited to, gated sine AC excitation, simple biphasic pulse excitation with DC coupling, or multi-phasic excitation using piecewise configured waveforms. These balanced excitation waveforms are within the scope of the present disclosure and can be arranged to cause the loop current or voltage to have no net DC component when measured over one or more completed scanning cycles.

Balanced operation can also significantly reduce the likelihood of chemical migration into or from the resistive loop, since there is no net gradient to drive materials through the surrounding solution. Garments incorporating this invention can benefit from this balance through increased operational lifetimes. Balancing is especially important if the resistive loops could come into direct contact with skin or if the surrounding solution can act as a migration medium to the skin for the eroded loop material. Balancing significantly helps reduce exposure to these materials by reducing the likelihood the materials become free to ingest or absorb.

True balanced operation is also made more feasible according to the teaching of this invention by providing for the electrically active portions of the touch sensing circuit, that is the resistive loops and the sensing contacts, to be configured so they are electrically isolated and floating from the remainder of the accessible parts of the systems. If these elements are allowed to float, many potential parasitic circuits that might be formed are inhibited, which improves the ability to balance the excitation signals in a predictable way. Isolating these circuit elements also provides an important safety feature since the same parasitic circuits that might disrupt the balanced operation might also result in undesirable leakage currents if there is an electrical fault or abnormal condition. Isolation of electrical circuits that may come into direct contact with a person is also often a requirement for product safety certification.

Although it is not a requirement or condition of this invention, the signal processing functions can beneficially be separated into more than one circuit. Separating the signal processing functions: eases the design of each portion since their individual functionality requirements are reduced; allows electrical isolation to be integrated into the device at a well controlled boundary between the signal processing sub circuits; and allows the highly time critical excitation scanning and analogue signal measurement functions to be logically and temporally separated from the often less time critical data manipulation and transmission functions. These sub circuit groupings can be easily achieved with modern microcontroller designs, but can optionally and alternatively be implemented using other analogue, digital or hybrid techniques known to the art. It is intended that all such designs and implementations are within the scope of the present disclosure.

Communicating the derived touch point locations to the intended system may be optionally performed using standard or proprietary methods that are appropriate for the intended system. For instance, for conventional personal computers the touch point information could be conveyed over a variety of wired and wireless means such as USB, RS-232 serial, WiFi, BlueTooth, IrDa and the like. There are also a variety of proprietary game ports associated with common gaming consoles as for which this invention could be adapted. In the area of industrial or robotic control, the touch point information could be conveyed as scaled analogue signals such as with 0-10 VDC or 4-20 rnA systems or digitally as HART, I2C, CAN buss or other means known to the art and such embodiments are intended to be included in the scope of this disclosure.

Further capabilities of such an invention include, but are not limited to, its ability to be configured on-the-fly with different "keyboard maps" or optionally, it can be provided with a number of touch point mapping configurations that can also remain resident in the signal processing elements and that can thus be rapidly recalled, selected or applied to alter the apparent behavior of the device. In this respect, a map (or mapping) refers to a translation function used by the system to generate a desired output relating to a particular physical touch that is detected. For instance, if the invention were implemented as a hand worn glove that was to function as a tradition push button keyboard substitute, then when the device detected a touch for instance between the tip of the thumb and the tip of the index finger, the touch could be "mapped" to produce an ASCII letter "Q". Another keyboard map might translate the same thumb tip to index finger tip touch as an ASCII letter "b". A particular type of touch could also be configured to produce more complex outputs, such as a predefined sequence of ASCII characters or a character that repeats periodically.

The translation function, or mapping, could easily be defined within the context of a program and could be implemented a number of ways, such as: by using a look-up table with predefined indexes and entries; by using a formula; or by using nested logical conditional rules. However, this translation does not necessarily need to be accomplished within a program, as there are many other techniques known in the art to detect and encode signals of this type.

It is further contemplated that a number of different materials or fabrics may be used to construct the garments. Examples of such materials include, but are not limited to leather, cotton, polyester, spandex, Kevlar, Nomex, Spectra, and rubber. The materials could be natural, synthetic, or combinations thereof. Different parts of the garment could optionally be made of different materials.

Different materials may have different physical characteristics such as elasticity or tendency to adapt to the wearer's body shape such as the case with leather. As a result, different circuit patterns (which may be applied by methods such as stitching or screen printing) may be required on different materials to accommodate issues of elasticity or other material distortions without inducing unacceptable stresses on the circuit patterns. For example, a zig-zag or stretch stitch or a serpentine path for the circuit pattern could be used on elasticized material or leather to allow the material to stretch without damaging the conductive circuit (as for example, snapping a thread or tearing a printed pattern). Such alternatives are also considered to be within the scope of the present disclosure.

It should be noted that throughout the above discussions, several alternatives and examples have been used to describe important aspects of this invention. These alternatives and examples are not exhaustive but are only intended to illustrate the wide range of variations that this invention teaches. No limitation of the invention to those examples described should be made.

Accordingly, this invention opens up a variety of options for human interface design where the control input mechanism is desired to be highly capable, unobtrusive, intuitive and safe.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

DESCRIPTION OF THE FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 is a schematic showing a circuit configuration where some of the current flowing in the resistive loop flows out of the loop to the sensing contact. The amount of current flowing to the sensing contact is determined by the location along on the resistive loop where the sensing contact touches the resistive loop.

FIG. 9A1 is a schematic showing conductive PADs on the resistive loop with the pads being larger than the conductive loop adjacent to the PADs.

FIG. 9A2 is a schematic showing dead end branches on the resistive loop.

FIG. 9B1 shows zig-zag regions on the resistive loop.

FIG. 9B2 shows recombined branches on the resistive loop.

DETAILED DESCRIPTION OF THE INVENTION

Figure 1:
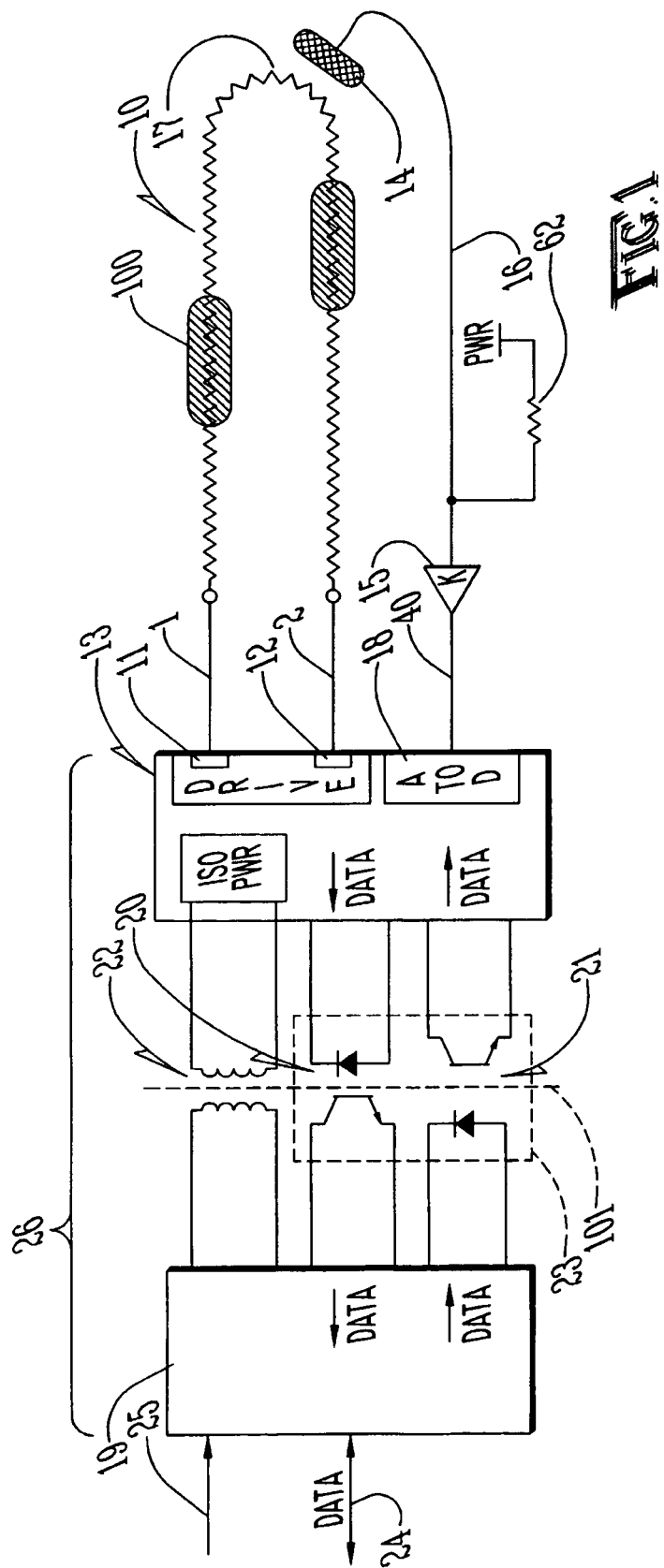
FIG. 1 shows a simple system configuration.

Referring to FIG. 1, a simple single loop, single sensing contact implementation of this invention can be achieved. The distal ends 1 and 2 of the resistive loop 10, are electrically connected to the excitation drive sources 11 and 12 respectively provided by the excitation scanning and analogue signal readout module 13. In one possible instance of this, simple differential voltage excitation can be produced by driving the output voltage on sources 11 and 12 to different values. This simple system is shown as using a single excited loop and a single sensing contact. The signal processing is partitioned into two sub-circuits to separate excitation scanning and analogue signal readout from measurement interpretation and control system communication functions. Electrical isolation 101 is indicated at the boundary between the signal processing sub-circuits.

It is also noted that excitation drive may be DC, AC or a constructed waveform; and that time dependent nature of excitation can be used to qualify detection of touch signals to reduce noise and improve interpretation capabilities. Although not shown in this simplified one loop example, time dependent nature of excitation can play an important correlation role when decoding which loop has been touched; and the combination of signal processing sub-circuits provides control and configuration functions, provides signal timing references and performs diagnostics on the touch detection process.

Signal processing circuits may optionally include microcontrollers, configurable analogue and digital circuits, firmware, software, conversion formulae, lookup tables or other control and measurement means known to the art.

A sensing contact 14 is also connected through an electrical signal return 16 to the excitation and scanning and analogue signal readout module 13, optionally through a signal conditioning circuit circuit 15. The end of the signal return 16 acts as the sensing contact 14 which may be placed into contact with the resistive loop 10 at a position between the distal ends of the resistive loop, notionally at the position indicated as 17. The signal detected by the sensing contact 14, either directly through 16 or through the optional signal conditioning circuit 15, is applied to an analogue to digital converter circuit 18 which is contained within the excitation scanning and analogue signal readout module 13. In the case of simple differential voltage excitation, the relative voltage measured along the length of the resistive loop is a function of the position along the loop. In this case, this is akin to the well known voltage divider potentiometer configuration. A high resistance value pull-up resistor 62 acts to place a high voltage signal on the signal return 16 if the sensing contact 14 is not contacting the resistive loop so that the signal conditioning circuit 15 returns a very high or very low signal level to the analogue to digital converter 18 in the absence of a touch. This makes it possible to distinguish a non-contact condition, which gives a very high voltage on the signal return 16, from a contact condition, which gives an intermediate voltage on the signal return 16. Alternately, a pull-down resistor could be used to place a very low voltage on the signal return 16. Other methods are well known in the art that could be used to distinguish a non-contact condition from a contact condition. Furthermore, as indicated in FIG. 10A for sources 11' and 12', the drive sources can be located either on the same garment as the sensing contact 14, or on another garment or elsewhere without departing from the scope of the present disclosure.

The resistive loop may optionally have one or more occluded regions 100 along its length, which act to prevent the sensing contact from touching regions of the loop. This feature may be advantageous in some implementations to assist the user touching only the intended points or regions on the loop. As well, certain regions on the loop may be occluded as a result of the methods used to apply or attach the loop to the underlying surface or fabric.

Power for the excitation scanning and analogue signal readout module 13 is provided through the galvanic isolation of transformer 22. Further, the excitation scanning and analogue signal readout module 13 is interfaced to the measurement interpretation and control system communication module 19 ideally through digital communications means. In FIG. 1, the digital communication between elements 13 and 19 is provided by optical signal couplers 20 and 21 which together form a bi-directional, galvanically isolated communication channel 23. This communication channel 23 can be used such that the loop excitation characteristics applied at 11 and 12 can be programatically configured as well as providing a mechanism to retrieve the digital representations of the signal measured at the touch location 17 by the measurement interpretation and control system communication module 19. The combination of 20, 21, and 22 provide a galvanic isolation layer 101.

For further reference, elements 13 and 19 can be advantageously constructed using programmable digital microcontrollers as is known to the art. These microcontroller devices typically integrate volatile and non-volatile memory, digital processing functions, digital and analogue input and output capabilities as well as other programmable and reconfigurable features useful when implementing this invention. The programmable memory, processing and input-output features can be used to hold and operate many of the aspects of this invention, such as measurement, interpretation and mapping functions as well as data storage and transmission. In particular, the analogue-to-digital conversion, loop excitation, calculation and computation aspects can be achieved. An example circuit of a microcontroller based 4 loop, 3 sensing contact glove implementation is shown in detail in FIG. 6. However, other methods, including analogue signal processing techniques can also be used to implement this invention. No limitation of this invention should be taken in this regard.

Figure 10:
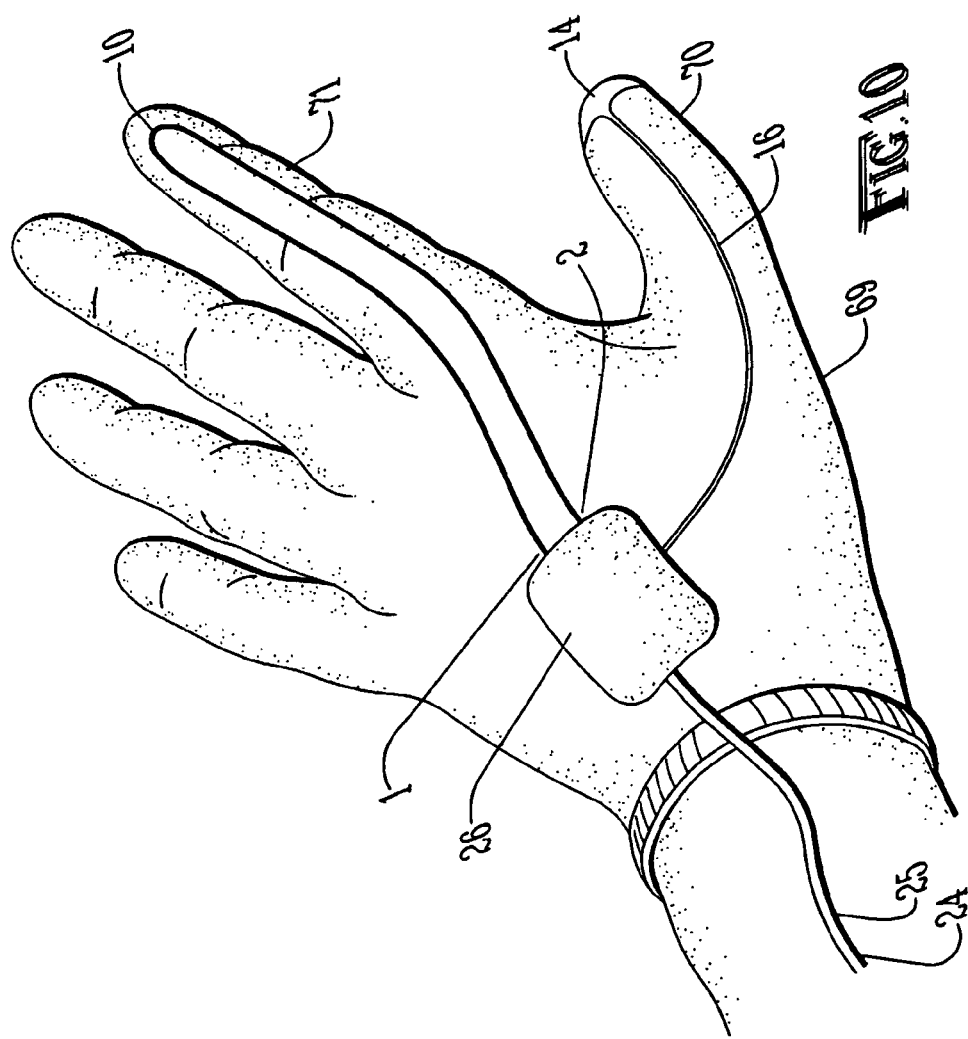
FIG. 10 shows a notional implementation of the invention as a glove with a single resistive loop and a single sensing contact.
Figure 10A:
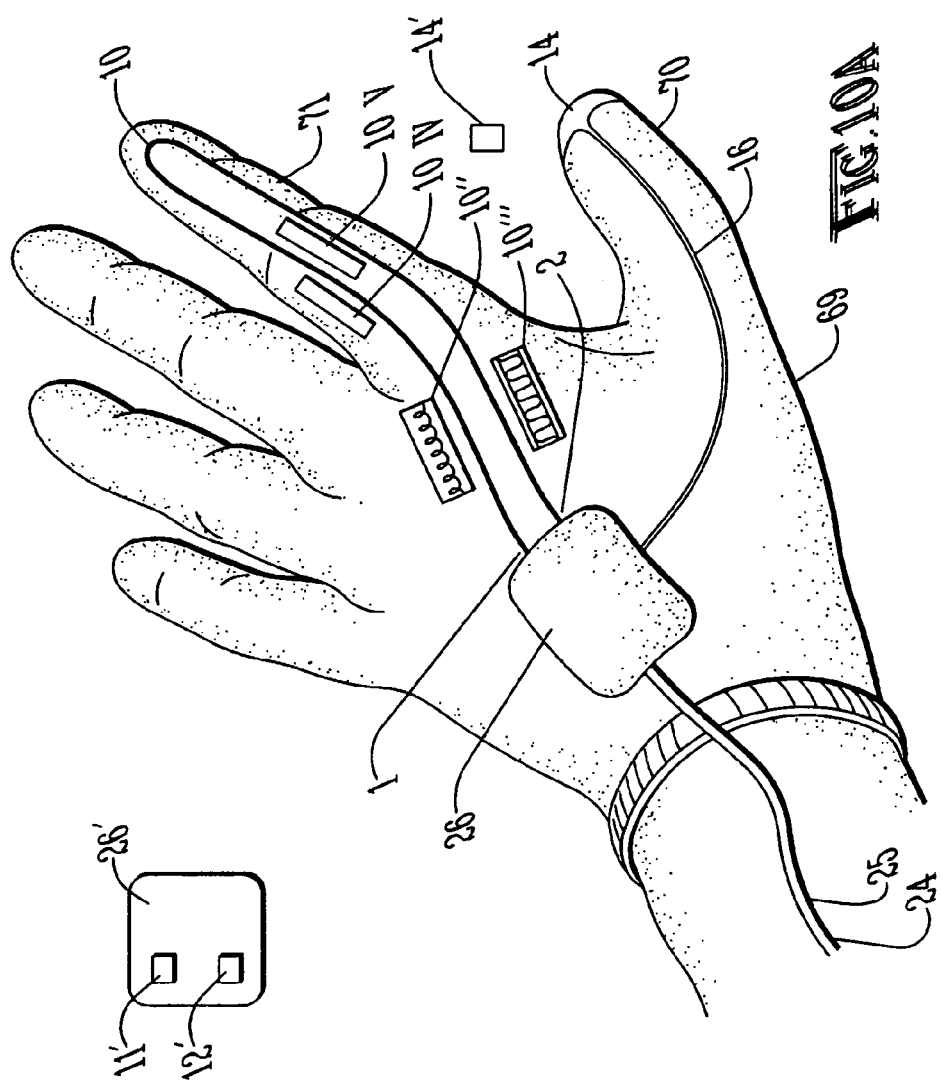
FIG. 10A shows notional implementation for various alternative forms of the invention.

FIG. 10 shows a simple glove implementation of the invention described above. In this figure, the glove garment 69, has a single resistive loop routed along the index finger 71 which is electrically connected to the signal processing circuit 26. The sensing contact 14 is mounted on the tip of the glove thumb 70. Data interpreted from thumb tip sensing contact touches to the resistive loop on the index finger is sent to the target computing system through communication channel 24 and power is provide through 25 which are shown in the figure as being combined into one physical cable connection.

Figure 4:
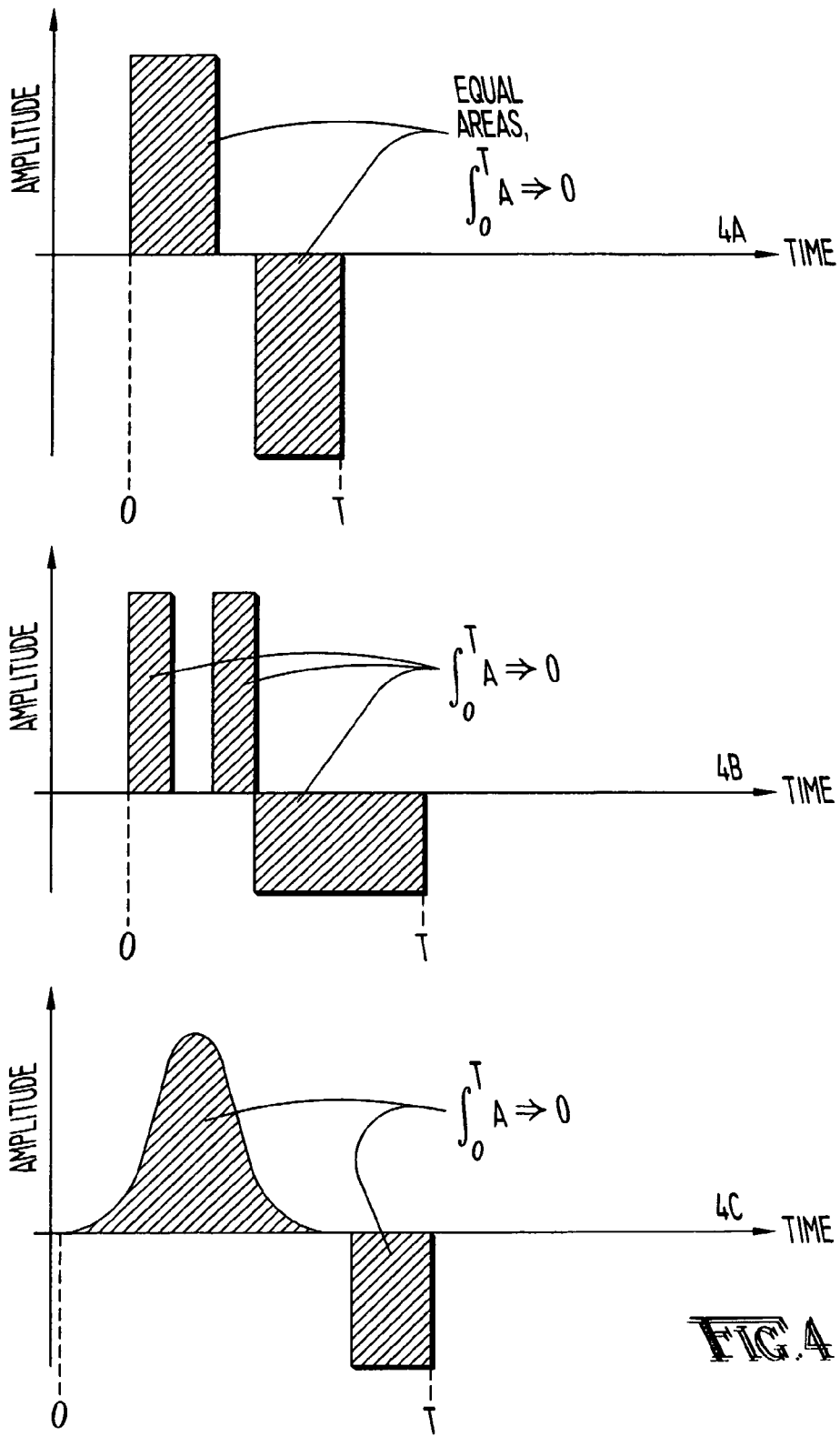

The character of the excitation in terms of amplitude, polarity and timing can be controlled by configuring the respective signals produced at the drive sources 11 and 12. For example, as shown in FIG. 4, by the relative amplitude and phase of the drive sources can cause the excitation amplitude to be sequentially bipolar, rectangular but with symmetry as in 4A or bipolar, rectangular but asymmetrical as in 4B. Using analogue programmable excitation sources, such as digital-to-analogue converters for elements 11 and 12, the excitation could be optionally configured to be as in 4C wherein the excitation is bipolar, non-rectangular and asymmetrical. In FIG. 4 it is noted that the integral of the signed amplitude over one pulse period is approximately zero, to provide for charge or current neutral excitation. However, unipolar excitation as well as many other variants are possible through techniques known to the art and may be advantageously applied in some applications.

Referring again to FIG. 1, communication to the external target system is provided through communication channel 24, which can be any one of a variety of schemes known to the art, for example USB or RS-232 serial. Additionally, sufficient electrical power for operating the device is introduced at 25.

In the configuration shown in FIG. 1, the generalized signal processing module 26 is divided into the two major sub modules, the excitation scanning and analogue signal readout module 13 and the measurement interpretation and control system communication module 19, interconnected as described. This has been shown in this way to emphasize the galvanic isolation aspect of this configuration, but other implementations wherein the elements 13 and 19 are intimately merged are possible.

Figure 2:
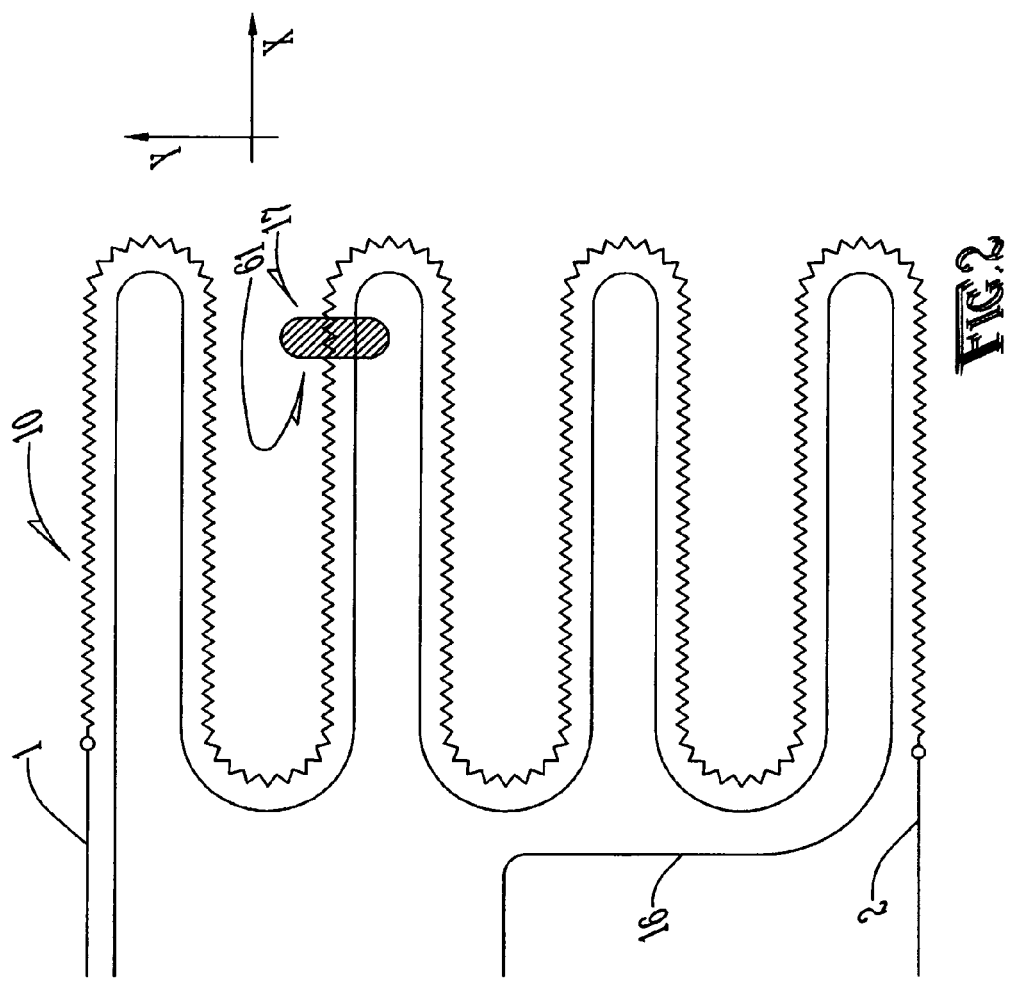
FIG. 2 shows a sensitive region layout that can effect a two dimensional position readout by using a resistive loop that serpentines and is interleaved with a sensing conductor.

FIG. 2 shows another layout implementation of the resistive loop 10 portion of the invention wherein the analogue signal return conductor 16 is placed adjacent to the resistive loop element along the extent of the resistive loop. The resistive loop 10 extends between the excitation sources 11 and 12 as in the previous example. The geometric layout of the loop is arranged to wrap back and forth across a surface. Touches are detected by bridging the loop 10 and signal conductor 16 by a conductive element 61, thus completing the sensing circuit connection to the intended touch point location. By careful geometrical placement of the resistive loop, a unique relationship can be defined relating the fraction of the electrical length identified by the touch point and a corresponding coordinate lying on the surface defined by the sensor. For instance, if the loop is excited by a voltage and the loop is constructed from a material with a uniform resistance per unit length, then the touch point will return a voltage signal that is a simple function of its distance from the ends of the loop. Given the distance to either of the loop ends defines a unique position along the loop and by implication a unique point on the surface on which the loop is arranged. It is a simple geometrical exercise to translate the length along a constrained path lying on a surface into the geometric coordinates on the path must pass.

Figure 3:
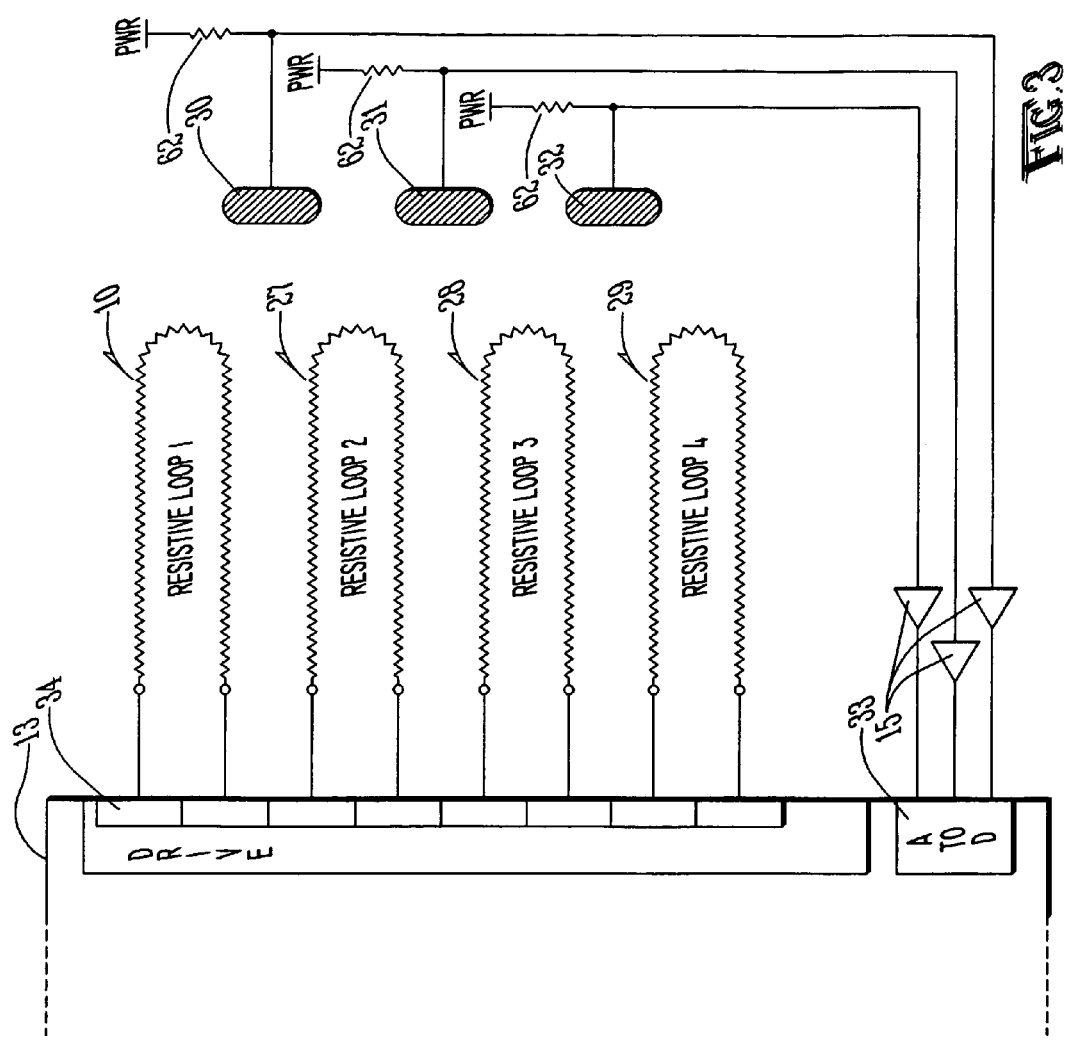
FIG. 3 shows a configuration expanded to multiple resistive loops provided with sequentially scanning excitation and multiple sensing contacts feeding a multiplicity of analogue signal measurement channels. Note that in this figure the signal processing circuitry representation has been greatly simplified to FIG. 4 shows several example excitation waveforms that achieve substantially balanced behavior.

FIG. 3 details an extended version of FIG. 1 wherein the system is equipped with four resistive loops 10, 27, 28 and 29 and three sensing contacts 30, 31 and 32. The sensing contacts are routed to a multi-channel digitizing circuit 33. Four discrete excitation source pairs are indicated as element 34, which are connected to their respective resistive loops as shown.

Figure 5:
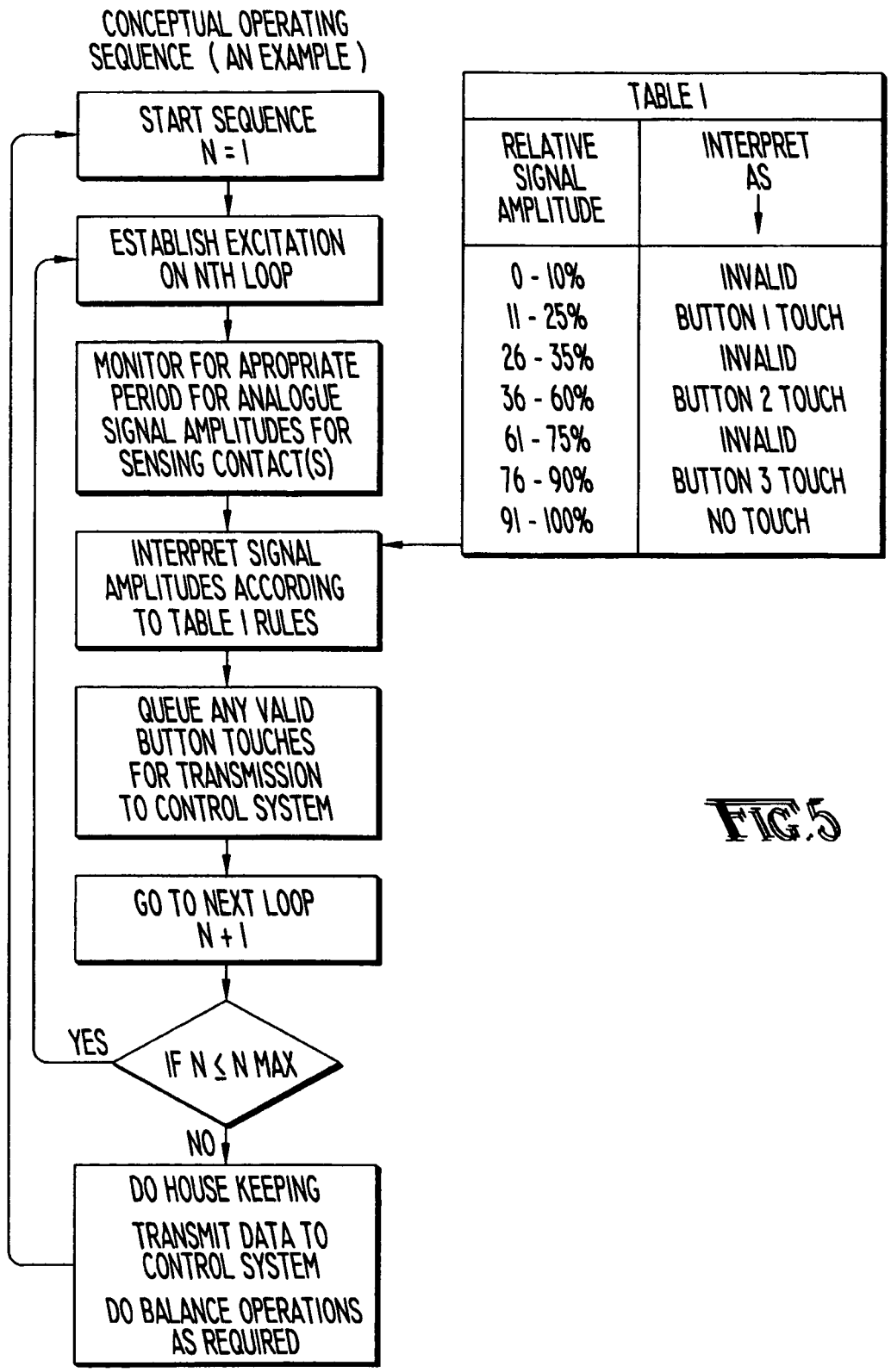
FIG. 5 shows an example of a conceptual operating cycle to operate a system configured for multiple virtual push-button type inputs and that uses sequentially scanned loop excitation and digital value binning and gating of the measured analogue signal values to interpret which virtual buttons have been activated.
Figure 6A:
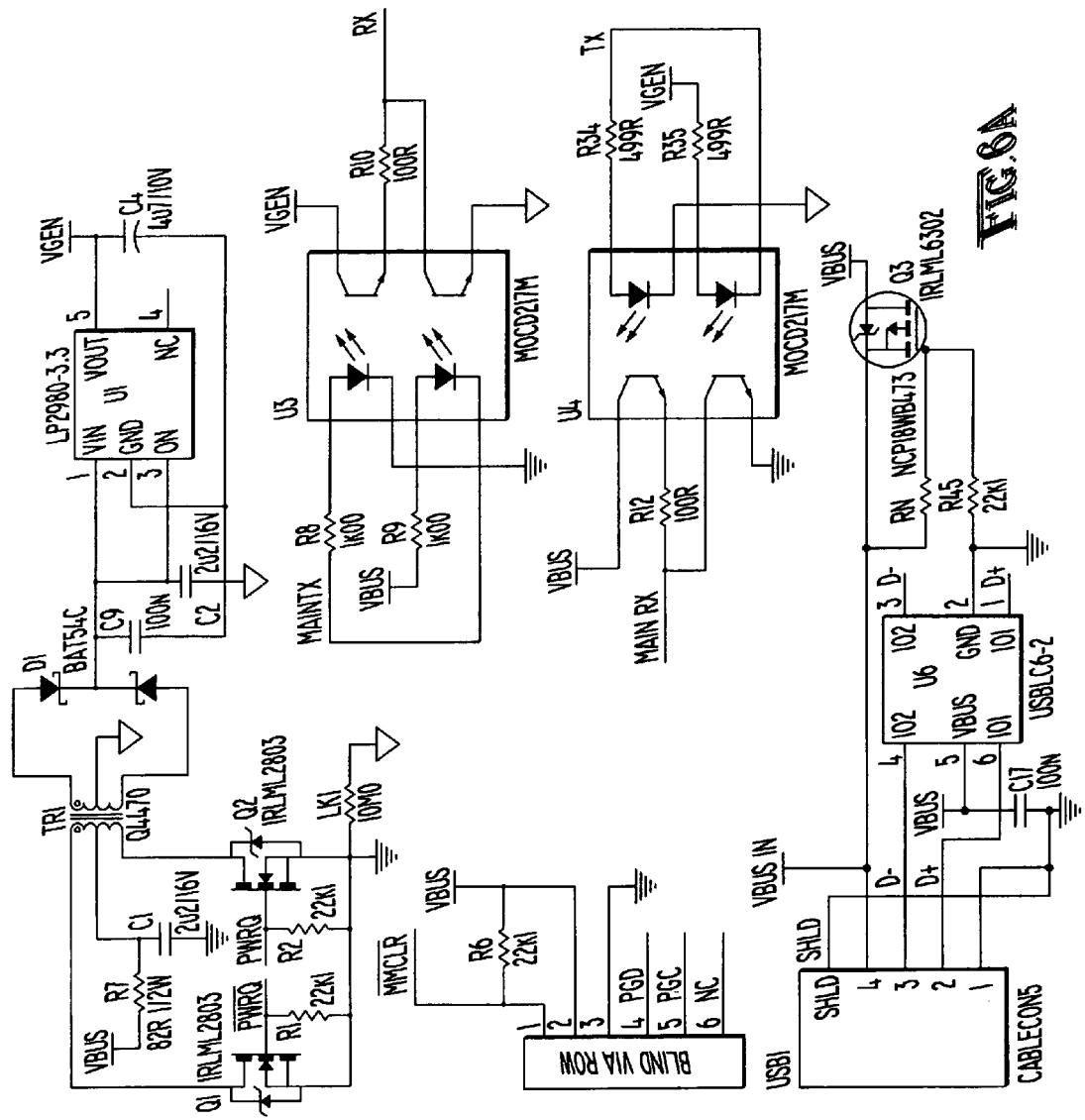
FIG. 6 shows one embodiment of the signal processing electronic circuitry.
Figure 6B:
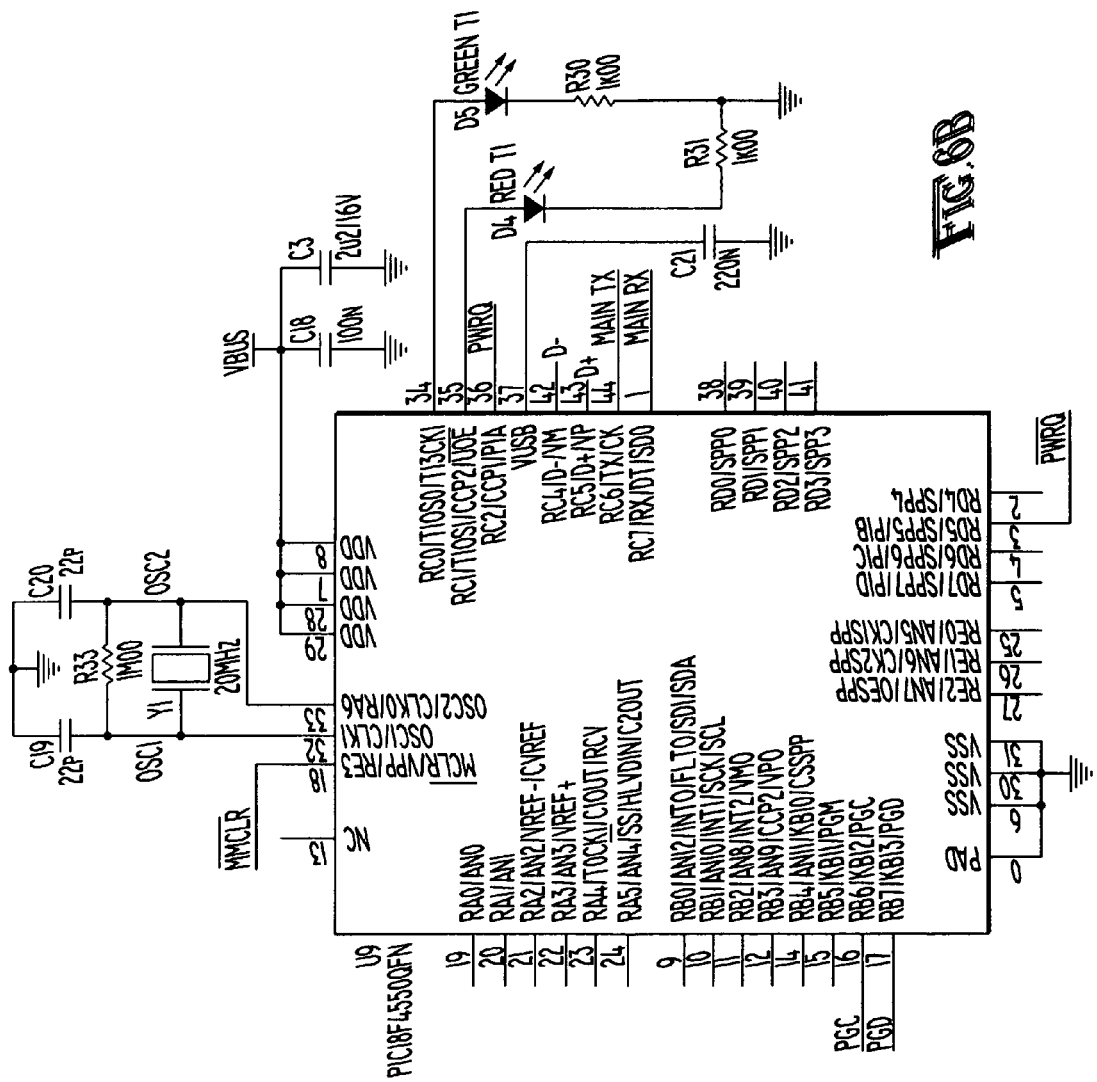
Figure 6C:
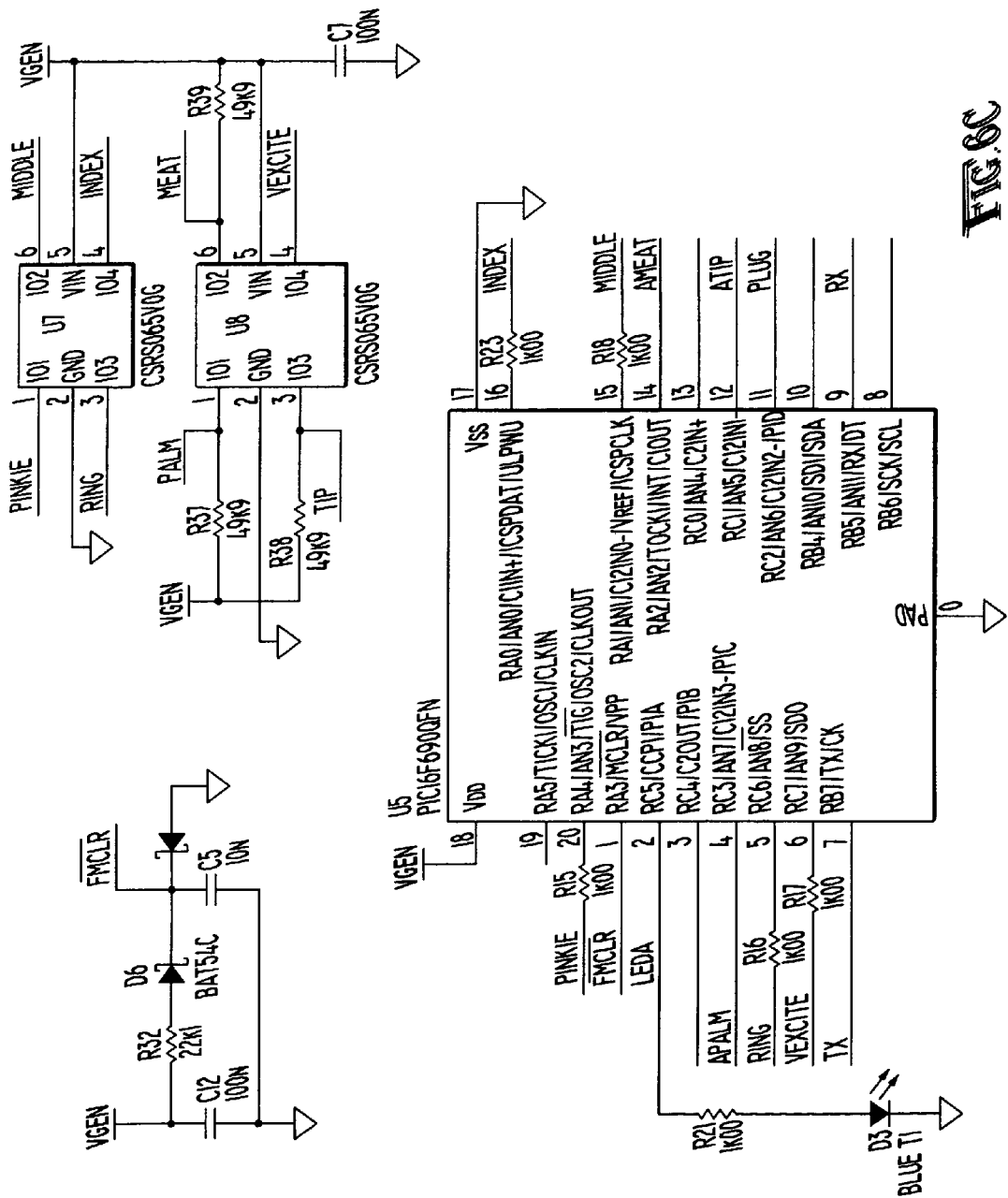
Figure 6D:
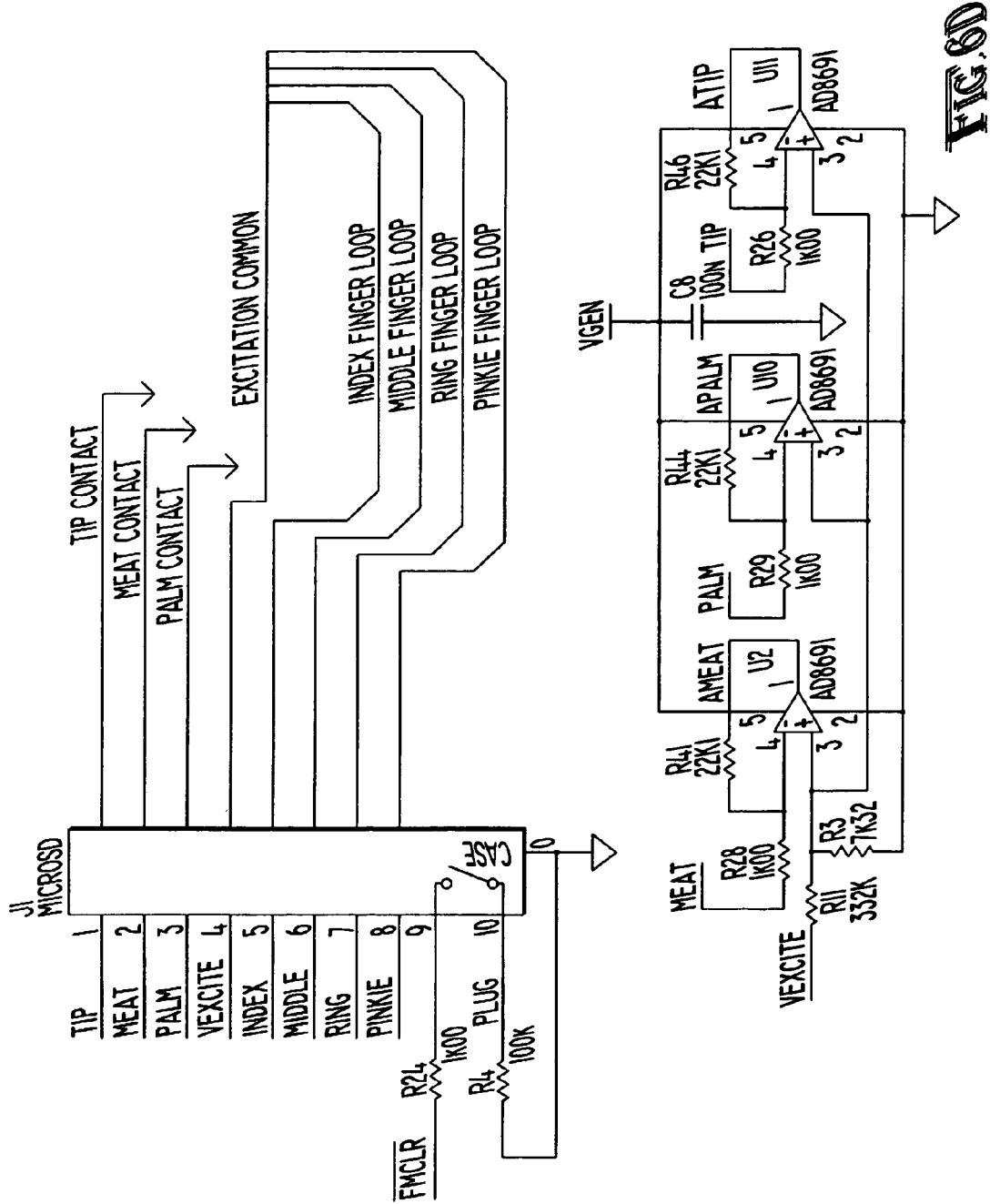

FIG. 5 indicates a nominal operational scan sequence that could be implemented on the system shown in FIGS. 1, 3 and 4. This excitation and readout sequence starts from a null excitation state by establishing a non-zero excitation signal across the first resistive loop 10. The other three loops are not excited, that is, both distal ends of each loop are held at the same potential.

After a period of time sufficient to allow the applied excitation signal to settle on the first loop, the analog-to-digital converters are interrogated to determine if one or more of the sensing contacts is in contact with the excited resistive loop. The presence of a contact is determined through the relative signal amplitude sensed on the signal contact. Very high or very low values measured at the analog to digital converter are associated with a non-contact condition because of the pull-up resistors 62, which can be arranged to drive the sensed signal to a default level in the absence of a modifying signal level introduced by a touch Intermediate amplitude values are associated with a contact occurring in the electrically active regions of the resistive loop.

If the digitized value corresponds to a value or range of values in the associated look-up table (or alternately a nested conditional stack), then the contact is deemed valid and the desired action associated with that contact is produced.

For illustration, assume for the moment that the system is arranged to act as a simple keyboard. If the look-up table or nested conditional stack contains a entry defined as a range of values, for instance "{if it is the first loop} and {if the amplitude value is from the first contact digitizer channel} and {if the values is in the range 780 to 900} then produce a {<Shift>a}", then if the detected contact returns a digitized value of 850, the system will determine that this was a valid contact to a touch point and will queue a "{<Shift>a}" for transmission to the downstream target control or computing system.

Note that it is consistent with this discussion to have the simple case where the detected contact returned value from the measurement circuit is merely linearized and transferred to the target computing system while maintaining relatively high information resolution regarding the touch position along the resistive loop. This is different than the case where a range of values gets binned into a few valid touch zones by a range test. In the high resolution scenario, the transmitted data can be used to simulate a continuous control action, such as would be produced by a conventional potentiometer. The selection of the granularity of the transmitted data, up to the underlying resolution and noise limits of the electronic circuitry, is discretionary. This allows the system to accomplish analogue control action.

Next, the excitation is removed from the first loop, the second loop is excited and the process is repeated until all four loops have been scanned and the analog-to-digital converters have been interrogated for each loop excitation cycle and all the required signals are queued and transmitted.

Once the scan portion of the cycle is completed, the system can optionally provide counter polarity excitation signals to all the loops to accomplish the charge or current balancing housekeeping and then revert to the null state to await the next scan cycle.

FIG. 6 shows one embodiment of the signal processing electronic circuitry to sequentially scan, excite, readout and encode for the detected touches on a glove implementation of this invention. Note that there are two microcontrollers used to separate the processing functions and that there are isolation components to separate the functional sides of the circuit.

Alternative excitation and contact sensing configurations could be employed to achieve the same general results as achieved with the simple loop voltage excitation discussed previously. For instance, as shown in FIG. 7, current I1 flows from the high side of the excitation circuit 11 through the resistive loop 10, and at the touch point 17 the current splits into current I2 and I3 where I3 flows to the low side of the excitation circuit 12 and I2 flows through the sensing contact to the signal return 16. The impedance 66 inserted between the signal return 16 and the input 38 of a current-to-voltage conversion circuit 45 improves the current splitting characteristics of the overall circuit. Finally the voltage output 40 of the current-to-voltage conversion circuit would be directed to the analog-to-digital converter 18 as in FIG. 1. The resulting digitized voltage can thus be used to determine the relative position of the touch point along the loop.

Figure 8A:
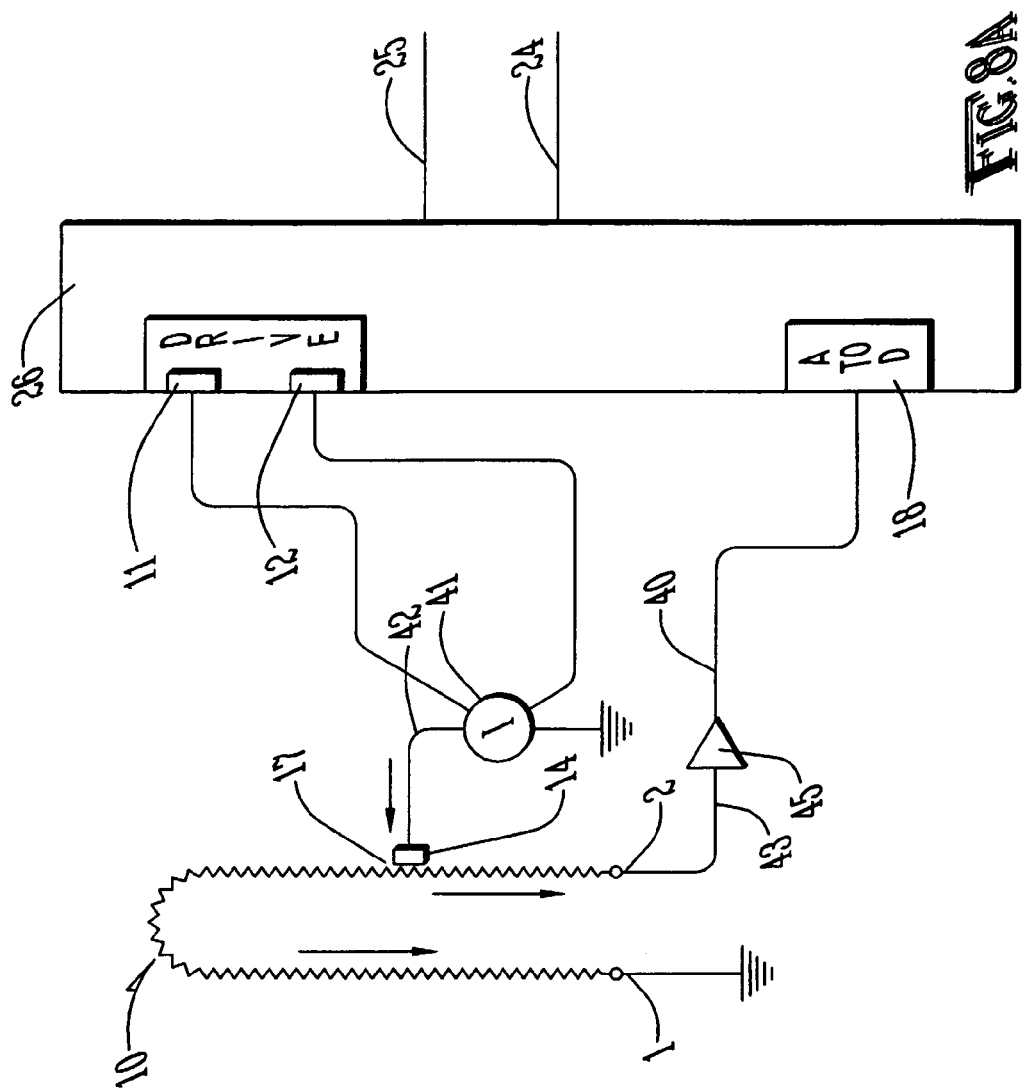
FIG. 8A is a schematic showing detection of the location of touch by injecting current from the sensing contact and having the sensing current split in the resistive loop/sensing contact circuit.
Figure 8B:
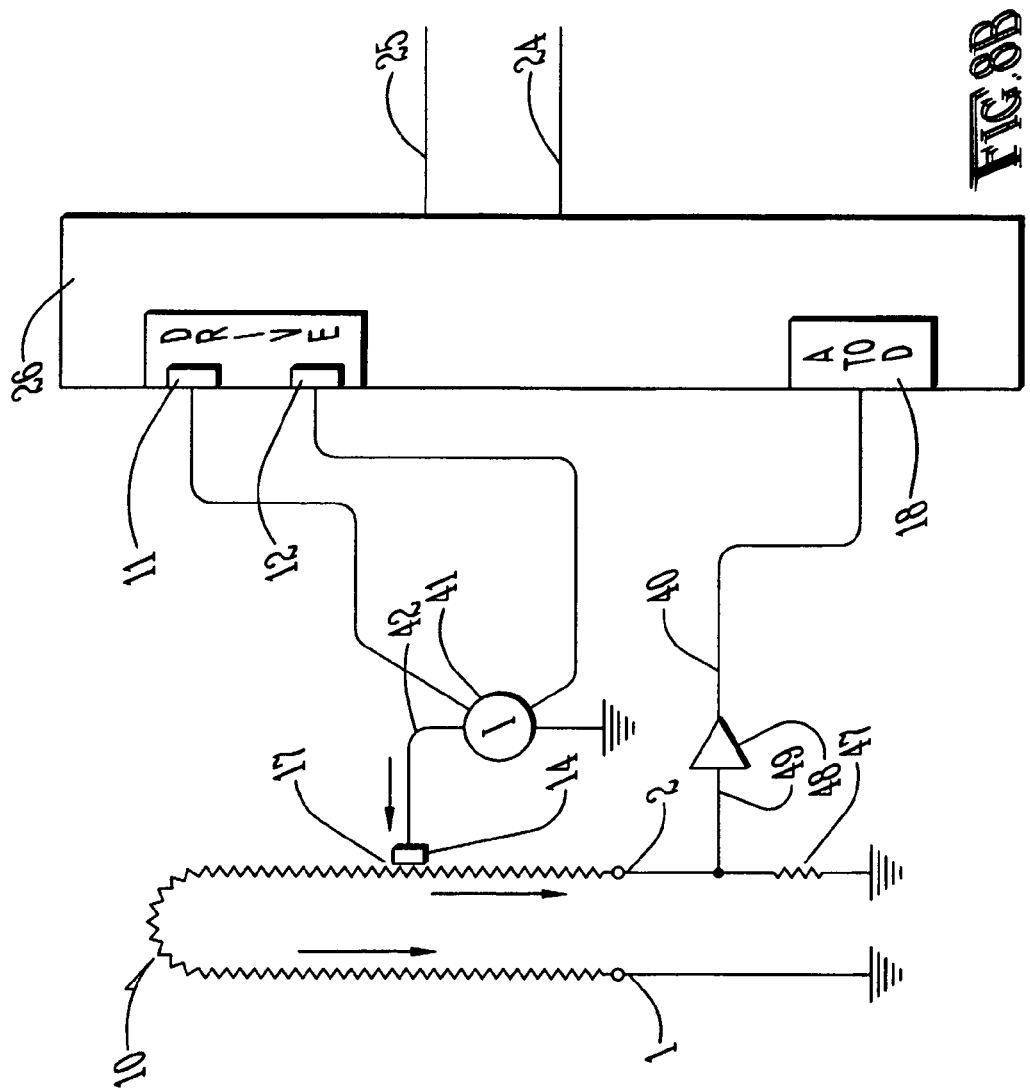
FIG. 8B is a schematic showing the use of voltage division to measure current split to detect the location of the touch point on the resistive loop.

Other variants of current division techniques are shown in FIGS. 8A and 8B. In these figures, the touch point acts as the current injection point into the resistive loop 10. Current I1 flows from current source 41 through the conductor 42 and the sensing contact 14 into the resistive loop 10 where it splits into current I2 and I3. The relative splitting of the total current between into the two sides of the resistive loop 10 effectively determines the touch position 17. In 8A the current I3 out of the sensing leg 43 is directed to a current to voltage conversion circuit 45 that generates a voltage signal at its output 40 that indicates the relative position of the touch point 17. In 8B the current I3 is translated into a representative voltage at the input 49 to signal conversion circuit 48 by the resistor 47. The signal at the output 40 of the signal conversion circuit indicates the relative position of the touch point 17. In both FIGS. 8A and 8B, the current source 41 is controlled by the drive sources 11 and 12.

In FIGS. 9A1 through 9B2, various possible techniques to produce pads, or other regions that make it easier for the user to target a contact region on the resistive loop 10, are shown. These regions can be created using broadened regions of the resistive loop as with 50 and 51; by including dead-end branches as in 52, 53, 54, 55 and 56; by creating zig-zag or serpentine regions of the loop as in 57 and 58; or by using recombining branches in the overall loop path as in 59 or 60.

Several alternatives for the system embodying the principles of the present invention are indicated in FIG. 10A. Not all the variations shown in FIG. 10A are intended to be included in a single embodiment but are being shown in a single figure for the sake of convenience. Accordingly, no limitation is intended by the disclosure of FIG. 10A.

In FIG. 10A, the end of sensing contact 14 is shown as being located on the tip of a digit, such as a user's thumb, but as indicated for contact 14', could be located elsewhere, on other digits, on the tips of other digits, or even separated from the garment, while still being within the teaching of this disclosure. Those skilled in the art will understand where to place the end of the sensing contact based on the teaching of this disclosure. Furthermore, while a glove is shown in FIG. 10, other garments can incorporate the system embodying the principles of the present invention without departing from the scope of this disclosure. Accordingly, while a glove is shown for illustrative purposes, it is not intended as a limitation of the scope of this disclosure.

Furthermore, while the electronic excitation source and the signal processing circuits are attached to the same garment as the curvilinear conductive element in some instances, these elements can be located on different garments or elsewhere as indicated in FIG. 10A for drive sources 11' and 12' and signal processing circuit 26'. As indicated by element 10'', the curvilinear conductive element can include a spring wound resistive metal wire. The curvilinear conductive element can be partially formed from conductive filler loaded elastomer compounds as indicated for element 10''', or partially formed by conductive ink printed onto the garment as indicated for element 10IV or sewn or embroidered into the garment as shown for element 10V.

INDUSTRIAL APPLICABILITY OF THE INVENTION

The present invention contemplates, but is not limited to:

1. A means and method for detecting the location of a touch within or along one or more resistive loops integrated into a fabric and where one or more sensing contacts return analogue signals representative of the contact positions along the loops.

2. The means and method as in 1, where the fabric is constructed into a garment covering a digit, hand, limb or other area.

3. The means and method as in 2, where the analogue signal is interpreted as representing one of a series of discrete regions along the resistive loop.

4. The means and method as in 2, where the resulting discrete position is conveyed to a control, computing or communication system.

5. The means and method as in 2, where the nature of the analogue signal is preserved and conveyed through analog or digital representations to a control, computing or communication system.

6. The means and method as in 1, wherein the resistive loop is excited in such a way as to substantially enforce net average loop current of zero through control of the excitation amplitude, polarity and application time.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A system for generating electronic data and/or control signals comprising:
   (a) a curvilinear conductive element attached to a garment adapted to be worn by a user,
   (b) an electrical excitation source electrically connected to the curvilinear element to apply a base data/signal to the curvilinear element;
   (c) a sensing electrode, said sensing electrode being capable of electrically contacting the curvilinear conductive element at various locations along the length of the curvilinear element, the 'curvilinear element having electrical characteristics such that when contacted by the sensing electrode a circuit will be formed that has electrical characteristics unique to the portion of the curvilinear element associated with the contact point" between the "sensing electrode and the curvilinear element located adjacent to the contact point so that a data/signal generated from the base data/signal via the portion is unique to that portion; and
   (d) circuitry connected to the sensing electrode and to the curvilinear element which receives a data/signal via the portion of the curvilinear element and which uses the unique data/signal associated with that portion to interpret the location of the sensing electrode with respect to the curvilinear element and transmitting data/signals responsive to the presence and location of the electrical contact between the sensing electrode and the curvilinear element.

2. The system defined in claim 1 wherein the sensing electrode is attached to the same garment as the curvilinear conductive element.

3. The system defined in claim 1 wherein the garment is a glove.

4. The system defined in claim 1 wherein the system further comprises memory which is adapted to be programmed with a configuration map that associates electrical contact locations along the length of the curvilinear conductive element to particular data or control signals desired to be output by the system.

5. The system defined in claim 1 having a programmatically defined region along the length of the curvilinear conductive element where a signal from the system will produce a fixed data/signal when the sensing electrode electrically contacts any location along that given region and where such region is defined by range of measurement values associated with the programmatically defined region.

6. The system defined in claim 1 further including a second curvilinear conductive element.

7. The system defined in claim 6 wherein the curvilinear conductive elements are connected to be excited individually or in groups.

8. The system defined in claim 1 wherein the curvilinear conductive element includes a spring wound resistive metal wire.

9. The system defined in claim 1 wherein the curvilinear conductive element is partially formed from conductive filler loaded elastomer compounds.

10. The system defined in claim 1 wherein the curvilinear conductive element is partially formed by conductive thread which is adapted to be sewn or embroidered into the garment.

11. The system defined in claim 1 wherein the curvilinear conductive element is partially formed by conductive ink printed onto the garment.

12. The system defined in claim 1 wherein the sensing electrode is configured as a long conductor attached to the same garment as the curvilinear conductive element and the sensing conductor runs parallel to the curvilinear conductive element along a substantial portion of the length of the curvilinear conductive element.

13. The system defined in claim 12 further including a bridge conductive element which is adapted to be moved to be connected to the curvilinear conductive element and to the long sensing conductor at a desired location along the curvilinear element.

14. The system defined in claim 1 wherein the circuitry connected to the sensing electrode and to the curvilinear element includes circuitry to generate data/signals that vary with sufficient range and resolution to simulate continuous or quasi-continuous behavior as the location where the sensing electrode electrically contacts the curvilinear conductive element is varied.

15. The system defined in claim 1 wherein the curvilinear conductive element includes branches.

16. The system defined in claim 1 further including pads attached to the curvilinear conductive element which are larger than the curvilinear conductive element located adjacent to the pads.

17. The system defined in claim 1 further including a data/signal generator which receives a unique data/signal that is indicative of the location along the length of the curvilinear conductive element where the sensing electrode makes contact with the curvilinear element and generates a data/control signal which is a sequence of data/control characters.

18. A system for generating electronic data and/or control signals comprising:
   (a) a curvilinear conductive element attached to a garment, said curvilinear conductive element having a first end and a second end and extending for a length along a curvilinear path between its first and second ends, said curvilinear element having various exposed locations along its length such that the curvilinear element can be electrically contacted at the exposed locations;
   (b) an electronic excitation source, said electronic excitation source being electrically connected to the first and second ends of the curvilinear conductive element and generating a differential electrical signal along the length of the curvilinear conductive element;
   (c) a sensing electrode that may electrically cotact an exposed location along the length of the curvilinear element, thereby conducting a first electrical signal from the exposed location, the curvilinear element having electrical characteristics such that when contacted by the sensing electrode a circuit will be formed that has electrical characteristics unique to the portion of the curvilinear element associated with the contact point between the sensing electrode and the curvilinear element located adjacent to the contact point so that a signal generated from the differential signal via the portion is unique to that portion;

(d) signal processing circuits that are connected to the sensing electrode and receive said first electrical signal therefrom and that generate a signal indicating the location along the length of the curvilinear conductive element where the sensing electrode electrically contacts the curvilinear conductive element.

19. The system defined in claim 18 wherein the signal processing circuits include two subcircuits with a first sub-circuit providing control of measurement functions of the differential signal and a second sub-circuit translating the measurement functions into digital data.

20. The system defined in claim 19 wherein the first signal processing sub-circuit and the second signal processing sub-circuit are electrically isolated from one another.

21. The system defined in claim 19 wherein the electronic excitation source and the first signal processing sub-circuit of each signal processing circuit are attached to the same garment as the curvilinear conductive element.

22. The system defined in claim 18 wherein the electronic excitation source and the signal processing circuits are attached to the same garment as the curvilinear conductive element.

23. The system defined in claim 18 wherein the electronic excitation source provides balanced excitation.

24. The system defined in claim 18 wherein the electronic excitation source and the curvilinear conductive element are adapted to produce a voltage gradient along the length of the curvilinear conductive element when the differential electric signal is applied to the curvilinear conductive element.

25. The system defined in claim 18 wherein the curvilinear conductive element has a plurality of branches.

26. A system for generating electronic data and/or control signals comprising:
(a) a curvilinear conductive element attached to a garment, said curvilinear conductive element having a first end and a second end and extending for a length along a curvilinear path between its first and second ends, said curvilinear element having various exposed locations along its length such that electrical contact with the curvilinear conductive element can be effected at the exposed locations;
(b) an electronic excitation source electrically connected to a sensing electrode and adapted to generate a signal;
(c) a sensing electrode that is adapted to electrically contact the curvilinear element at an exposed location along the length of the curvilinear element, thereby conducting an electrical signal from the electronic excitation source to the exposed location;
(d) a first electrical signal being conducted to the first end of the curvilinear element and a second electrical signal being conducted to the second end of the curvilinear element when the sensing electrode electrically contacts an exposed location along the length of the curvilinear element; and
(e) signal processing circuits that receive electrical signals from the curvilinear element and generate a signal in response thereto indicating the location along the length of the curvilinear conductive element where the sensing electrode electrically contacts the curvilinear conductive element.

27. A system for generating data and/or control signals comprising:
(a) a garment adapted to be worn by a user;
(b) a resistive loop located in the garment, the resistive loop being one-piece and having a plurality of portions which are positioned with respect to the garment to be exposed for electrical contact;
(c) an electrical contact element located in position to be manipulated by the user to contact the resistive loop at an exposed portion to define an electrical circuit, the electrical circuit thus defined being unique to the portion of the resistive loop associated with the exposed portion being contacted by the electrical contact element, the resistive loop having a plurality of exposed portions whereby a plurality of different electrical circuits are associated with the resistive loop;
(d) a data/signal processing circuit electrically connected to the resistive loop and to the contact element, the data/signal processing circuit including a data/signal generator to generate a data/signal to the resistive loop, the data/signal received by the resistive loop being applied to an electrical circuit defined by the resistive loop and the electrical contact element to be modified thereby to produce a modified data/signal, each electrical circuit being different from other electrical circuits whereby the modified data/signal associated with each electrical circuit is unique to that circuit, the data/signal processing circuit further including a data/signal receiver which is connected to the data/signal generator via an electrical circuit defined by the resistive loop and the electrical contact element to receive a modified data/signal from an electrical circuit defined by the resistive loop and the electrical contact.

28. The system defined in claim 27 wherein the exposed portions of the resistive loop are spaced apart so that the data/signal associated with each exposed portion is location dependent.

29. The system defined in claim 27 wherein the resistive element has a first end and a second end and extends along a curvilinear path between the first end and the second end, the data/signal generator being connected to the first and second ends of the curvilinear resistive loop, the base signal being a differential electrical signal.

30. The system defined in claim 27 further including an electronic excitation source electrically connected to the resistive loop to establish a base potential on the resistive loop, the base potential being applied via the resistive loop to each exposed portion and to the electrical circuit associated therewith when the electrical contact element is in contact therewith, each electrical circuit being different from other electrical circuits associated with the resistive loop to have electrical characteristics which are unique to the exposed portion of the resistive loop associated therewith in conjunction with the electrical contact element whereby a plurality of different electrical circuits are associated with the resistive loop.

31. A system for generating electronic data and/or control signals comprising:
a curvilinear conductive element attached to a garment;
a sensing electrode, said sensing electrode being capable of electrically contacting the curvilinear conductive element at various locations along the length of the curvilinear element;
the system interpreting the location of said electrical contact and transmitting signals responsive to the presence and location of said electrical contact; and the electrical contact to the curvilinear conductive element resulting from an action on the part of the intended user of the system.

32. A system for providing user input to an electronic device comprising:

a source of electronic signals;

a signal processing system;

a garment which is adapted to be worn by a user;

a curvilinear conductive element mounted on the garment, the curvilinear element being continuous and one-piece and extending across a region of the garment in a one-piece uninterrupted manner and defining an uninterrupted continuum of touch points on the single, one-piece curvilinear element, the curvilinear conductive element being electrically connected to the source of electronic signals to receive source signals therefrom;

a sensing electrode which is spaced apart from the curvilinear conductive element and which combines with the curvilinear element when in contact therewith to generate a location based signal which is unique to the location of contact between the sensing electrode and the curvilinear conductive element whereby a continuum of location-based signals are available via the continuous curvilinear conductive element and the sensing electrode; and the sensing electrode being electrically connected to the signal processing system to send location-based signals thereto for use thereby.

33. The system defined in claim 32 wherein the sensing electrode is mounted on the garment and is spaced apart from the sensing element.

34. The system defined in claim 32 wherein one or more portions of the curvilinear conductive element are occluded by an insulating barrier in a manner that prevents contact between the sensing electrode and the curvilinear conductive element in the occluded regions.

* * * * *